(12) United States Patent
Bauer et al.

(10) Patent No.: US 7,136,060 B2
(45) Date of Patent: Nov. 14, 2006

(54) METHOD FOR SELECTING, PROCESSING AND DISPLAYING DATA OR DATA OBJECTS

(75) Inventors: Christian Bauer, Karlsruche (DE); Olaf Gatzemeier, Gaggenau (DE); Klaus Jehle, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 358 days.

(21) Appl. No.: 10/347,398

(22) Filed: Jan. 21, 2003

(65) Prior Publication Data

US 2003/0137509 A1 Jul. 24, 2003

Related U.S. Application Data

(63) Continuation of application No. PCT/DE01/02684, filed on Jul. 18, 2001.

(30) Foreign Application Priority Data

Jul. 20, 2000 (DE) .............................. 100 35 270

(51) Int. Cl.
*G06T 15/00* (2006.01)
(52) U.S. Cl. ...................... 345/419; 345/420; 345/645

(58) Field of Classification Search ................ 345/419, 345/420, 645
See application file for complete search history.

(56) References Cited

U.S. PATENT DOCUMENTS

| 5,272,642 A | * | 12/1993 | Suzuki .......................... 700/182 |
| 5,553,209 A | * | 9/1996 | Johnson et al. .............. 345/667 |
| 5,777,621 A | * | 7/1998 | Schneider et al. ........... 345/428 |
| 6,219,053 B1 | * | 4/2001 | Tachibana et al. ........... 715/835 |

FOREIGN PATENT DOCUMENTS

| DE | 42 12 173 A1 | 10/1992 |
| EP | 0 919 896 A1 | 6/1999 |

* cited by examiner

*Primary Examiner*—Kimbinh T. Nguyen
(74) *Attorney, Agent, or Firm*—Sughrue Mion, PLLC

(57) ABSTRACT

A method for selecting, processing and displaying data or data objects (13 to 16, 21 to 23, 30) that are stored in a predetermined hierarchy in addressable memory locations of a data processing system. The hierarchy has a tree structure with a trunk and branched-off subdivisions. The method allows the association or common processing of the data or the data objects (13 to 16, 22 to 23, 30) derived from listings on different hierarchical levels of the tree structure in a common table.

19 Claims, 1 Drawing Sheet

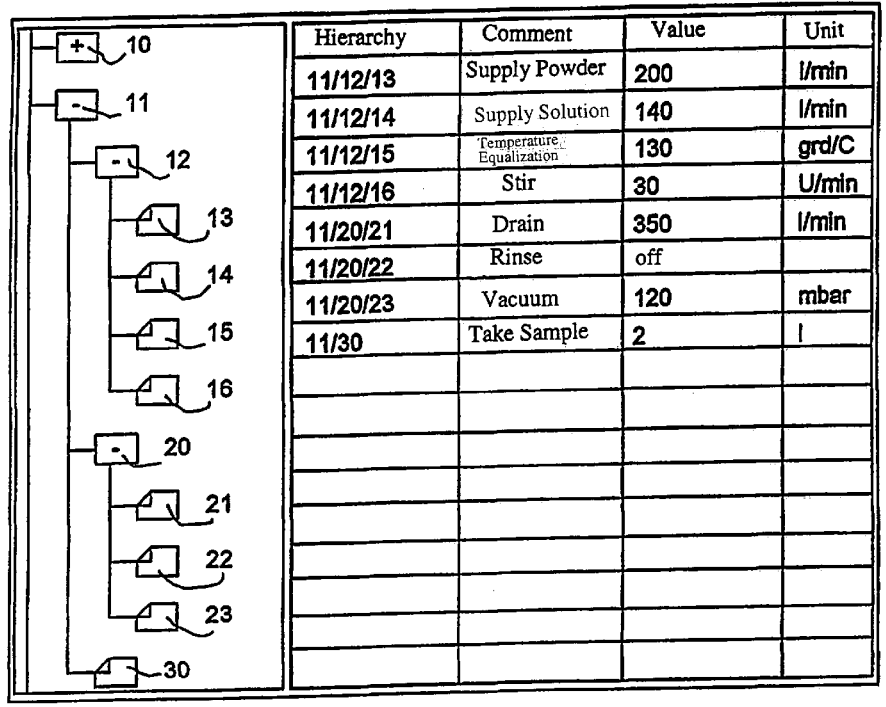

| Hierarchy | Comment | Value | Unit | | | | | | | | | | |
|---|---|---|---|---|---|---|---|---|---|---|---|---|---|
| 11/12/13 | Supply Powder | 200 | l/min | | | | | | | | | | |
| 11/12/14 | Supply Solution | 140 | l/min | | | | | | | | | | |
| 11/12/15 | Temperature Equalization | 130 | grd/C | | | | | | | | | | |
| 11/12/16 | Stir | 30 | U/min | | | | | | | | | | |
| 11/20/21 | Drain | 350 | l/min | | | | | | | | | | |
| 11/20/22 | Rinse | off | | | | | | | | | | | |
| 11/20/23 | Vacuum | 120 | mbar | | | | | | | | | | |
| 11/30 | Take Sample | 2 | l | | | | | | | | | | |

METHOD FOR SELECTING, PROCESSING AND DISPLAYING DATA OR DATA OBJECTS

The following disclosure is a continuation of based on PCT Patent Application No. PCT/DE01/02684, filed on Jul. 18, 2001, which is incorporated into this application by reference.

FIELD OF AND BACKGROUND OF THE INVENTION

The invention relates to a method for selecting, processing and/or displaying data in an electronic data processing system, and associated software and systems.

It is well-known in the art to control electronic data processing systems in such a way that, for the selection of stored, calculated or otherwise established data, the data is stored in a predefined hierarchy in addressable memory locations. These hierarchies generally have a so-called tree structure with a trunk and branched-off subdivisions, or branches, to enable efficient and reliable program-controlled processing of predefined routines and the corresponding allocation of data volumes.

Particularly when specific program parts are addressed and data from any given subdivisions of the tree structure are simultaneously allocated, conventional methods have the disadvantage that the hierarchical tree structure can select, process or also display only one list of data or data addresses contained in a subdivision. In these known methods, lists of data or data addresses in hierarchically higher or lower branched subdivisions cannot be readily interlinked with one another because these two aspects, tree structure and list in table form, are processed separately. In other words, it is possible either to select individual objects in the hierarchy or to carry out mass processing in the table without a hierarchical order.

OBJECTS OF THE INVENTION

Thus, it is one object of the present invention to overcome the problems just described. A more particular object of the invention is to provide a method for selecting, processing and/or displaying data that enables an optimal linkage of data objects from different hierarchical levels and fields.

SUMMARY OF THE INVENTION

According to the invention, a method for selecting, processing and displaying data or data objects that are stored in a predefined hierarchy in addressable memory locations of a data processing system, in which the hierarchy has a tree structure with a trunk and branched-off subdivisions, is advantageously further developed by linking or jointly processing data or data objects from lists on different hierarchical levels of the tree structure in a common table.

It is particularly advantageous if the lists of data or data objects on different hierarchical levels are displayed jointly and the data or data objects are selected and processed in a table that can likewise be tracked visually. The tree structure can be displayed on a screen in a simple manner by using predefined symbols for the data or the data objects and the branching points, and the selection can be made, e.g., by keyboard commands of the data processing system and/or by operating a computer mouse.

The inventive method is advantageous because the data or data objects are still in hierarchical order, but selected objects can be jointly processed in the form of a list, independent of their hierarchical arrangement. The invention thus proposes to combine a tree structure with a table system. In the tree structure, the tree node that is to be processed (root or any underlying node) is selected. The table, however, includes not only the objects that are located directly in the tree node, but also all the objects in any tree nodes below that. In the table display, the properties of these objects can be processed and documented directly. The table can also comprise several registers. As a result, hierarchically arranged objects can be mass-processed and a clear display and clear documentation of the object properties are achieved.

To implement the method, a software module is provided, which can be run on a data processing system. This software module can in particular be run on a programming device suitable for programming a control program to control a technical process.

These and other features of preferred embodiments of the invention are described in the claims as well as in the specification and the drawings. The individual features may be implemented either alone or in combination as embodiments of the invention, or may be implemented in other fields of application. Further, they may represent advantageous embodiments that are protectable in their own right, for which protection either is now or will be claimed.

BRIEF DESCRIPTION OF THE DRAWINGS

The invention will now be described in greater detail with reference to the exemplary embodiment depicted in the drawing. The single drawing FIGURE shows a detail of a screen displaying symbols that represent the data or data objects in a tree structure and that illustrate the innovation of combining a tree display with a table display.

DETAILED DESCRIPTION OF THE PREFERRED EMBODIMENTS

The objects of the tree structure in the FIGURE symbolize data or data objects, e.g., program steps or program groups, to control an electrical device or a technical plant, which must work in conjunction with a large amount of measurement data or control inputs. The objects in this display may also represent so-called tree nodes and can be provided with any desired designations. Here, for the sake of clarity, they are simply numbered with reference numerals throughout. The comments and values in the columns of the FIGURE are merely given as an example of possible ways to depict the technical process.

The exemplary embodiment depicted can be used, for instance, to control a detergent production process. A first object 10 represents a partial unit of this detergent production process, the substructure of which is masked in the tree. An object 11 represents another partial unit of the detergent production process, the substructure of which is shown. Object 12 represents a technical function and objects 13 to 16 represent function elements of this technical function. An object 20 represents an additional technical function, which has function elements 21 to 23. An object 30, for instance, represents a function element directly under the partial unit of object 11.

In the tree structure depicted in the FIGURE, the tree node 11, for example, can be selected for processing. In the separate table display, not only object 30, which is located directly in the tree node 11, is displayed but also all the objects 13 to 16 and 21 to 23 located in the underlying tree nodes 12 and 20.

As a further example, the tree node 10 can also be selected for processing, even though its substructure is not currently shown. Once the tree node 10 is selected, all of the objects located in all the underlying tree nodes of node 10 are then displayed in the separate table display.

In the separate table display arranged on the right-hand side of the screen detail illustrated here, measured values, status values and set points or, more generally, the properties for each object can be displayed in at least one row, and, accordingly, documented and/or processed. Complex objects with many properties can be displayed, e.g., in a table with several registers. In this case the registers can each contain the same types of properties of the objects.

In the exemplary embodiment shown, the first table column is used to indicate the hierarchy of the corresponding object within the tree. As such, a particular entry found in the first table column represents the link between the adjacent, corresponding row of the table and the overall tree structure.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for selecting, processing or displaying at least one of data or data objects that are stored in a predefined hierarchy in addressable memory locations of a data processing system, comprising:
   organizing the hierarchy as a tree structure with a trunk and branched-off subdivisions;
   selecting a data object; and
   for the selected object, executing at least one of displaying or jointly processing in a common table at least one of data subordinate to the selected data object and data objects subordinate to the selected data object, the data and data objects are stemming from lists on different hierarchical levels of the tree structure;
   wherein the lists of the data or of the data objects are jointly displayed on different hierarchical levels, and wherein, in addition, at least one of measured values, status values or set points for the data or the data objects are displayed and processed in table form in the common table.

2. Method as claimed in claim 1, wherein the tree structure is displayed on a screen with predefined symbols for the data or the data objects and for tree nodes of the tree structure, and wherein a selection of a given one of the data or the data objects is made by at least one of a keyboard command of the data processing system or actuation of a computer mouse.

3. The method according to claim 1, wherein the subordinate data or data objects are data that belong to the selected data object or data objects that belong to the selected data object, wherein the common table displays only the subordinate data or the subordinate data objects, and wherein the displayed data or the displayed data objects are jointly processed.

4. The method as claimed in claim 1, wherein the lists of the data or of the data objects are jointly displayed in the tree structure on the different hierarchical levels.

5. A software module implemented on a computer-readable medium for a data processing system for at least one of selecting, processing or displaying at least one of data or data objects, comprising:
   a predefined hierarchy that stores the data or the data objects in addressable memory locations of a data processing system, the hierarchy having a tree structure with a trunk and branched-off subdivisions, and
   a module component for selecting a data object and for one of displaying and jointly processing in a common table data subordinate to the selected data object or data objects subordinate to the selected data object, the data or data objects stem from lists on different hierarchical levels of the tree structure;
   wherein the module component jointly displays the lists of the data or of the data objects on different hierarchical levels, and wherein the module component displays and processes at least one of measured values, status values or set points for the data or the data objects in table form on the common table.

6. Software module as claimed in claim 5, wherein the module component displays the tree structure on a screen with predefined symbols for the data or the data objects and for tree nodes of the tree structure, and wherein the module component processes at least one of keyboard commands of the data processing system or computer mouse commands for the selecting, processing or displaying.

7. A method for selecting, processing or displaying objects that are stored in a predetermined hierarchy in addressable memory locations of a data processing system, comprising:
   storing the objects according to the predetermined hierarchy in the addressable memory locations, at least some of the objects having at least two nested levels in the hierarchy;
   displaying the hierarchy using predetermined symbols;
   selecting one of the objects having the at least two nested levels, and
   displaying, for the selected object and for at least an overlapping time along with the hierarchy, a table of information concerning the objects stored in both of the two nested levels of the hierarchy,
   wherein the table displays only the data or data objects that are subordinate to the selected object, wherein the selected object is a parent node in the tree structure and the subordinate data or data objects are child nodes of the parent node, and wherein, when an icon of the selected object is selected from the displayed hierarchy, simultaneously displaying all of the subordinate data or data objects in the table.

8. The method according to claim 7, further comprising:
   navigating through the stored objects with aid of the displayed hierarchy and the displayed table; and
   manipulating the objects and data associated with the objects using a data entry interface.

9. The method according to claim 8, further comprising controlling an electrical device utilizing the stored and manipulated objects.

10. The method according to claim 8, further comprising controlling an automated process in an industrial plant utilizing the stored and manipulated objects.

11. The method according to claim 7, wherein said displaying steps comprise:
   in the hierarchy, displaying icons representing data objects and interconnections between the icons, the icons and interconnections depicting the levels of the hierarchy from a root level to a final nested level; and in the table, for the selected object, displaying the information for all data objects from at least the final nested levels that are subordinate to the selected data object.

12. The method according to claim 11, wherein the final nested levels subordinate to the selected data object include mutually differing levels of nesting in different branches of the hierarchy.

13. The method according to claim 11, wherein the data objects represent functional sub-modules of a production process.

14. The method according to claim 11, wherein one row in the table, respectively, is allocated for display of the information for each of the data objects from at least the final nested levels.

15. The method according to claim 11, wherein one column of the table is allocated for display of the respective hierarchies for each of the data objects from at least the final nested levels, the column using a display format other than the icons and the interconnections.

16. A method for selecting, processing or displaying at least one of data or data objects that are stored in a predefined hierarchy in addressable memory locations of a data processing system, comprising:
    organizing the hierarchy as a tree structure with a trunk and branched-off subdivisions;
    selecting a data object; and
    for the selected object, executing at least one of displaying or jointly processing in a common table at least one of data subordinate to the selected data objector and data objects subordinate to the selected data object, the data or and data objects are stemming from lists on different hierarchical levels of the tree structure,
    wherein the select object comprises at least one of a program or a portion of a program controlling an electrical device or a technical plant and wherein the subordinate data or data objects comprise at least one of a technological function and an element of the technological function.

17. The method according to claim 16, wherein the table displays measured values for each of the data or data objects displayed.

18. A method for selecting, processing or displaying at least one of data or data objects that are stored in a predefined hierarchy in addressable memory locations of a data processing system, comprising:
    organizing the hierarchy as a tree structure with a trunk and branched-off subdivisions;
    selecting a data object; and
    for the selected object, executing at least one of displaying or jointly processing in a common table at least one of data subordinate to the selected data objector and data objects subordinate to the selected data object, the data or and data objects are stemming from lists on different hierarchical levels of the tree structure,
    wherein the organized hierarchy is displayed in the tree structure to a user and wherein the common table is displayed to the user.

19. A method for selecting, processing or displaying at least one of data or data objects that are stored in a predefined hierarchy in addressable memory locations of a data processing system, comprising:
    organizing the hierarchy as a tree structure with a trunk and branched-off subdivisions;
    selecting a data object; and
    for the selected object, executing at least one of displaying or jointly processing in a common table at least one of data subordinate to the selected data objector and data objects subordinate to the selected data object, the data or and data objects are stemming from lists on different hierarchical levels of the tree structure,
    wherein the data and the data objects relate to a control of a technical plant.

* * * * *